No. 732,563. PATENTED JUNE 30, 1903.
W. S. KEYES.
PROCESS OF DESICCATING FRUITS.
APPLICATION FILED JULY 21, 1902.
NO MODEL.
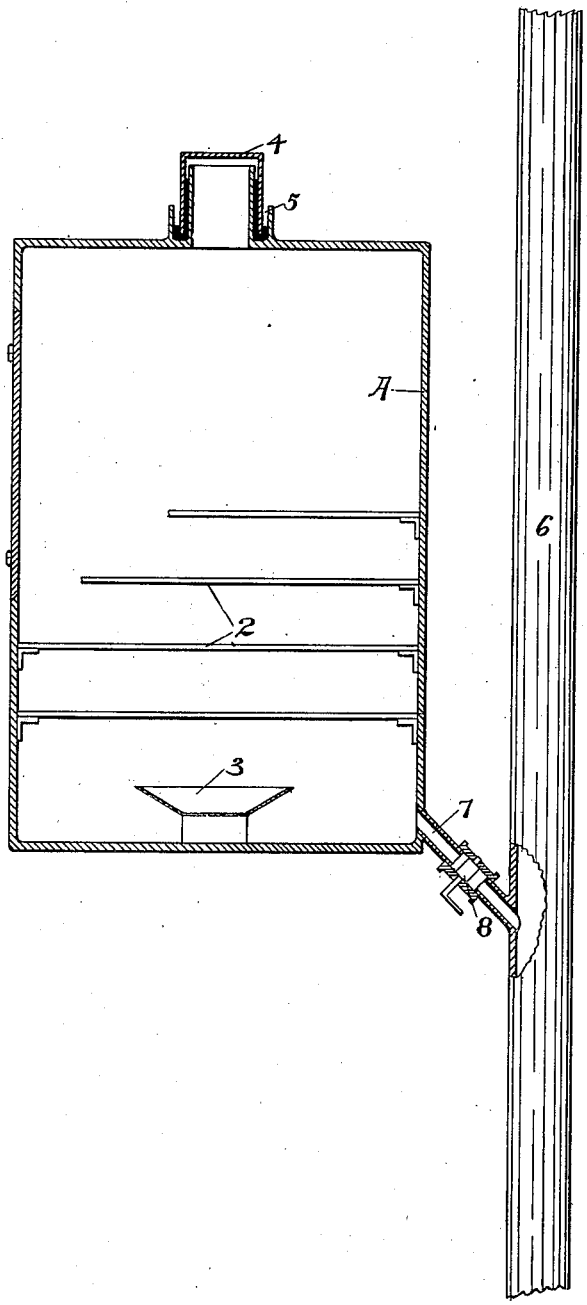

No. 732,563. Patented June 30, 1903.

UNITED STATES PATENT OFFICE.

WINFIELD S. KEYES, OF SAN FRANCISCO, CALIFORNIA.

PROCESS OF DESICCATING FRUIT.

SPECIFICATION forming part of Letters Patent No. 732,563, dated June 30, 1903.

Application filed July 21, 1902. Serial No. 116,441. (No specimens.)

*To all whom it may concern:*

Be it known that I, WINFIELD S. KEYES, a citizen of the United States, residing in the city and county of San Francisco, State of California, have invented an Improvement in Processes of Desiccating and Preserving Fruit, Vegetables, and the Like; and I hereby declare the following to be a full, clear, and exact description of the same.

My invention relates to a process for the desiccation and preservation of fruit, vegetables, and other water-containing articles or substances and involves the step of drying the fruit by the use of an anhydrous substance in the presence of a vacuum.

The drawing shows a sectional view of a simple form of apparatus for carrying out my invention.

The invention resides in introducing the fruit or article to be dried into a receptacle capable of being made air-tight, and in which receptacle there is contained a substance possessing a great affinity for water, as caustic lime or anhydrous sulfuric acid. A vacuum is then produced within the apparatus by any suitable mechanism, and the moisture extracted from the fruit is immediately taken up by the anhydrous substance. It has been found that raisins and other fruit dried and cured in this manner remain, even after a considerable lapse of time, soft and pliable and show no signs of sugar incrustation, such as usually appears upon raisins after they have been dried a long time. Neither is the fruit subject to discoloration, as with sun-dried fruits, which latter must be bleached or "sulfured" to a degree often rendering them injurious to health before they are considered merchantable.

While I do not wish to limit myself to any particular anhydrous substance nor to any particular form of apparatus, I prefer either lime or sulfuric acid mentioned above on account of their economic value, and in the drawing I have shown a simple well-known means for creating the necessary vacuum where a suitable flow of water is available.

A represents a receptacle of suitable shape and dimensions, in which are arranged a series of trays 2, supporting the fruit. Any suitable substance adapted to effect dehydration is placed in a pan 3 beneath the trays. Access is had to the interior of the receptacle through an opening in the top, which opening may be closed by a cap 4, preferably of glass set in a mercury seal 5. Water is allowed to flow through pipe 6, which connects with the receptacle by a short inclined pipe 7. The latter is provided with a suitable valve or cock 8. The lower end of pipe 6 should be in excess of thirty-three feet below pipe 7, and the weight and suction of the flowing water will create a vacuum within the drying-chamber. As soon as the proper vacuum is formed the cock 8 is turned and the flow of water may be checked.

By observing the difference in levels in the mercury seal on either side of the glass cap the operator may always tell whether the vacuum is being maintained.

With the air removed from the chamber the dehydrating substance seeks its affinity in the moist fruit.

As this process of drying can be carried on without the aid of heat, the tendency of the fruit to become hard and shriveled is entirely obviated.

Having thus described my invention, what I claim, and desire to secure by Letters Patent, is—

The process herein described of desiccating fruits, such as raisins, consisting in introducing the raisins into a tight chamber and placing within said chamber a substance possessing a great affinity for moisture and for saccharine juices of the raisins; and then producing a vacuum within the chamber to extract the moisture from the raisins and allow it to be absorbed by said substance whereby the raisins remain tender, soft and free from sugar incrustation.

In witness whereof I have hereunto set my hand.

WINFIELD S. KEYES.

Witnesses:
COLIN M. BOYD,
J. R. K. NUTTALL.